United States Patent Office 3,015,645
Patented Jan. 2, 1962

3,015,645
SILICA POWDERS
Leslie J. Tyler, Midland, Mich., assignor to Dow Corning Corporation, Midland, Mich., a corporation of Michigan
No Drawing. Filed Oct. 6, 1954, Ser. No. 460,773
12 Claims. (Cl. 260—46.5)

This invention relates to new silica compositions and to methods of preparing them.

This application is a continuation-in-part of applicant's copending application Serial No. 160,099, filed May 4, 1950, entitled, "Silica Powders," now abandoned.

Many tons of finely divided silica are used each year in commerce. Much of this material is of natural occurrence, such as diatomaceous earth, but a considerable portion thereof is synthetically prepared by such processes as burning a volatile silicon compound to produce the so-called fume silicas or by drying a silica hydrogel (i.e. a gel composed of $SiO_2$ and water). When hydrogels are air dried, the resulting product is a relatively coarse material having a bulk density of from 0.7 to 1 gram per cc. More finely divided materials are obtained if the water in the hydrogel is replaced with an organic solvent to give a so-called organogel and the solvent is then evaporated at an elevated temperature. When the temperature during evaporation is above the critical temperature of the solvent, the product is an exceedingly light material, having a bulk density of about 0.09 gram per cc. These silicas are commonly known as aerogels. The preparation of aerogels involves the use of pressure equipment, and hence is comparatively expensive.

A more economical method is that of removing the organic solvent at a temperature below the critical pressure. In this case the resulting product has a bulk density varying from 0.09 to .7 gram per cc., depending upon the concentration of silica in the initial gel. Silicas thus prepared are called xerogels.

Heretofore the only silicas which were known to reinforce siloxane elastomers (i.e. to produce an elastomer having an efficiency upwards of 150) were certain silicas having a heat of wetting by water of from 0.3 to 1 calorie per cc. of pore volume. These materials are fully described in U.S. Patent No. 2,541,137. The applicant has found that xerogels, which of themselves are non-reinforcing in siloxane elastomers, are made so when modified in accordance with the process of this invention.

It is an object of this invention to prepare silica fillers which will produce a reinforcing action when incorporated in siloxane elastomers. Another object is to provide silica fillers which are superior for use in siloxane elastomers to those heretofore employed. Other objects and advantages will be apparent from the following description.

In accordance with this invention hydrophobic organosilicon powders are prepared by reacting (1) an organosilicon compound of the group $R_nSiX_{4-n}$ and $$R_nSiO_{\frac{4-n}{2}}$$

in which R is an aliphatic hydrocarbon radical of less than 5 carbon atoms or phenyl, there being no more than 1 phenyl radical attached to each silicon atom, X is chlorine or an alkoxy radical of less than 6 carbon atoms, and $n$ has a value from 2 to 3 inclusive, with (2) an organogel in which at least 50 mol percent of the polymer units are $SiO_2$ units and any remaining units being of the formula $R'SiO_{1.5}$ in which R' is an aliphatic hydrocarbon radical of less than 5 carbon atoms, said organogel (2) having from .02 to .35 g. of total $SiO_2$ and $R'SiO_{1.5}$ per cc. and said organosilicon compound (1) being present in amount such that there is at least .04 organo silyl unit of compound (1) per polymer unit of (2). After reaction is complete the volatile materials are removed from the organogel whereby a dry powdery material having a pore volume of at least 3 cc. per g. is obtained.

Organogels as is known in the art are prepared from hydrogels by the step comprising replacing the water in the hydrogel with an organic solvent. During this replacement there is little or no shrinkage of the gel so that the density of the organogel is the same as that of the original hydrogel. The organogels (2) which are employed in this invention can be either silica organogels or cogels of silica and monoorganosiloxanes. The silica organogels are best prepared from sodium silicate by acidifying a solution of the latter, allowing the silica to gel and thereafter replacing the water in the gel interstices with an organic solvent. The cogels are best prepared by acidifying a solution of a mixture of sodium silicate and a salt of the formula

in which $x$ has a value from 1 to 2. Upon acidification of such a solution, a cogel will be obtained in which some of the gel units are $SiO_2$ and the remaining units are $R'SiO_{1.5}$. Thus the cogels are actually copolymers of silica and monoorganosiloxanes. The water in the interstices of the cogel is then replaced by an organic solvent.

In all cases the organogels employed in this invention should have densities of from .02 to .35 gram per cc. The density of the gel has reference to the grams of total $SiO_2$ plus $R'SiO_{1.5}$ per cc. of gel.

For the purpose of this invention monoorganosiloxanes which may be copolymerized with the $SiO_2$ in organogel (2) are those having aliphatic hydrocarbon radicals of less than 5 carbon atoms attached to the silicon. Specific examples of such materials are monomethylsiloxane, monopropylsiloxane, monovinylsiloxane, monoallylsiloxane and monobutylsiloxane and combinations thereof.

For the purpose of this invention compound (1) must be present in amount sufficient that there is at least .04 organosilyl groups (i.e. $R_2Si=$ or $R_3Si—$) per polymer unit in (2) (i.e. based on total $SiO_2$ plus $R'SiO_{1.5}$ in 2). If compound (1) is present in amount less than the specified amount, the resulting material does not have the reinforcing action desired for siloxane elastomers. However, any amount of organosilicon compound (1) above that above defined amount may be employed without deleteriously affecting the reinforcing action of the silica. In those cases where an excessive amount of organosilicon compound (1) is employed, say 15 to 20 organosilyl units per polymer unit in (2), it merely acts as a solvent. When chloro or alkoxy silanes are used as compound (1) they are in general, for the sake of economy, employed in amount from .04 to 2 mols, preferably .06 to 2 mols per mol of compound (2) (i.e. per mol of $SiO_2$ or per mol of $SiO_2$ plus $R'SiO_{1.5}$).

It has been found that any organochlorosilane or organoalkoxysilane or organosiloxane can be made to react with silica gels or cogels. However, for the purpose of this invention the R groups in organosilicon compound (1) must be aliphatic hydrocarbon radicals of less than 5 carbon atoms or phenyl radicals. However, there should be no more than 1 phenyl radical attached to each silicon. As is shown the organosilicon compound (1) can be either a monomeric chlorosilane or a monomeric alkoxysilane or it can be a polysiloxane. In all cases there should be from 2 to 3 inclusive of the defined hydrocarbon radicals per silicon atom. For the purpose of this invention it is preferred that the alkoxy radicals contain less than 6 carbon atoms.

Specific examples of silanes which are operative in this invention are trimethylchlorosilane, trimethylethoxysilane, dimethyldichlorosilane, dimethylphenylchlorosilane, tributylisopropoxysilane, triethylmethoxysilane, ethyldimethylbutoxysilane, vinyldimethylchlorosilane and phenylmethyldichlorosilane. Examples of specific siloxanes (1) which are operative herein are hexamethyldisiloxane, hexabutyldisiloxane, dimethylsiloxane, phenylmethylsiloxane, ethylmethylsiloxane, vinylmethylsiloxane, divinyltetramethyldisiloxane, diphenyltetramethyldisiloxane, allylmethylsiloxane, and copolymers of any of the above.

For the purpose of this invention the viscosity of the siloxane is not critical. However, it is preferable that they be low viscosity materials since handling is thereby facilitated.

The solvents which are employed to make the organogels of this invention are those which are inert to the above defined silanes. Such solvents include aromatic hydrocarbons, aliphatic hydrocarbons, chlorinated aliphatic and chlorinated aromatic hydrocarbons, ketones, ethers, and tertiary amines. In addition the solvents may be low viscosity siloxanes such as hexamethyldisiloxane or copolymeric dimethyl-trimethylsiloxanes.

The use of organic solvents is applicable both for reacting the silanes and the siloxanes with the organogel (2). However, when a siloxane is to be reacted it may serve both as the solvent in the organogel and as the reactant (1). Thus the preparation of the compounds of this invention may involve adding the siloxane directly to a hydrogel having the composition of compound (2). In this case the siloxane will replace the water from the hydrogel forming an organogel and at the same time will react with the silica and any $R'SiO_{1.5}$ in the organogel to form the compounds of this invention.

The temperature of the reaction is not critical and may range from say 30° C. to the reflux temperature of the solvent or above. After reaction is complete the solvent and any excess organosilicon compound (1) are removed by evaporation or other suitable means to give the finely divided organosilicon powders of this invention.

When siloxanes or ethoxy silanes are employed as reactant (1) it is preferable that a trace of either a chlorosilane or HCl or other strong acids such as $H_2SO_4$ or benzene sulfonic acid be present as a catalyst for the reaction. When a catalyst is employed, the reaction proceeds at a satisfactory rate even at room temperature.

The products of this invention are believed to be formed by the reaction of the silane X radicals with the silicon bonded hydroxyl groups in compound (2). The reaction may be represented schematically by the equation $\equiv SiOH + XSiR_n \rightarrow \equiv SiOSiR_n + HX$. It is believed that the reaction of the siloxane with the organogel (2) involves the formation of $\equiv SiY$ compounds in situ. Y is an acid anion such as Cl, $-HSO_4$ and the like depending upon the acid catalyst used. These may either react directly with the hydroxyls on the organogel (2) in accordance with the equation $$\equiv SiOH + YsiR_n \rightarrow \equiv SiOSiR_n + HY$$

or they may first hydrolyze to silanols which in turn condense with the hydroxyls on organogel (2) in accordance with the equation $\equiv SiOH + HOSiR_n \rightarrow \equiv SiOSiR_n + H_2O$. In all cases, the organosilyl groups of compounds (1) are chemically bonded to the silicon atoms of compound (2) by SiOSi linkages.

The products of this invention produce a reinforcing action when incorporated in siloxane elastomers to such an extent that the elastomers have efficiencies of upwards of 150. The efficiency of the elastomer is a product of the tensile in p.s.i., times percent elongation at break, divided by 1000. This reinforcing action is not obtained with untreated xerogels nor with xerogels which have been treated with siloxanes such as hexamethyldisiloxane or dimethylsiloxane. Furthermore, the reinforcing action obtained by the products of this invention is superior to that of xerogels, fume silicas and silica aerogels which have been treated with chlorosilanes, silazanes or other reactive silanes.

The hydrophobic powders of this invention are useful for thermal insulation. They are superior therefor over other silicas due to the lack of water absorption which gives an increase in insulating value. In addition they may be employed as flatting agents in paints and as cosmetic bases.

The following examples are illustrative only and should not be construed as limiting the invention which is properly set forth in the appended claims.

EXAMPLE 1

A sodium silicate solution was neutralized with HCl and allowed to stand until a gel formed. The gel had a density of about 0.108 gram of $SiO_2$ per cc. It was washed with water until chloride free and then with acetone until water free. The acetone was then replaced by washing with carbon tetrachloride.

A portion of this gel containing 250 grams of $SiO_2$ was stirred with 200 grams of $(CH_3)_3SiCl$. The mixture was heated at reflux temperature for two hours and then evaporated to dryness in an open tray. Final treatment was by heating to 105° C. at 300 mm. pressure. The product obtained was a light, soft powder having a bulk density of .08 gram per cc. and was composed of $SiO_2$ and trimethylsilyl units linked through oxygen atoms. The presence of the trimethylsilyl groups was established by infrared analysis and by carbon analysis.

The material was employed as a filler in a dimethylsiloxane elastomer, and the resulting rubber had an efficiency of 412.

EXAMPLE 2

The various materials shown in the table below were all prepared as follows:

Silica hydrogels having the densities indicated were prepared by neutralizing a sodium silicate solution with HCl and allowing the sol to set. The resulting gels were broken into pieces of less than one inch in cross section and washed with acetone until water free. The resulting product was an organogel having the same density as that of the hydrogel. In those cases where a water-immiscible solvent was employed, the water was first removed with acetone, which in turn was replaced by the indicated solvent. The various silanes shown were added to the organogels, and the mixture was allowed to stand at room temperature for twenty-four hours. The solvent and excess silane were removed by evaporation in a drying oven.

The resulting materials were compounded with a dimethylsiloxane polymer and vulcanized to an elastomer. In each case the ratio of filler to polymer was 30 parts filler per 100 parts polymer, and 3 percent by weight t-butyl perbenzoate based upon the weight of the siloxane was employed as the vulcanizing agent.

The effect of the density of the organogel on the reinforcing action in the siloxane elastomer is shown in run 4 while the effect of employing other than the defined silanes is evident from run 9.

The bulk density of the silica products was determined by placing a sample in a graduated cylinder and gently tapping the outside of the container fifty times. The weight of the sample in grams was determined and divided by the volume in cc. to give the bulk density in grams per cc.

All of the products described below have a pore volume of at least 3 cc. per gram except run 4. In the latter, the pore volume was 2.5 cc. per gram. The pore volume was determined in accordance with the procedure described in U.S. Patent 2,541,137 except that octamethylcyclotetrasiloxane was employed in place of water.

In all runs shown in the table the ratio of organosilyl groups to silicon atoms of the $SiO_2$ was between .06 and .6.

Table I

| No. | Density of Organogel in g. per cc. | Solvent | Silane | Wt. Ratio: Silane/SiO$_2$ | Bulk density of finished Product in g. per cc. | Efficiency of Elastomer |
|---|---|---|---|---|---|---|
| 1 | 0.104 | Acetone | $(CH_3)_3SiCl$ | 0.8 | 0.11 | 805 |
| 2 | 0.014 | $CH_2Cl_2$ | $(CH_3)_3SiCl$ | 2.0 | 0.10 | 695 |
| 3 | 0.104 | $CH_2Cl_2$ | $(CH_3)_3SiCl$ | 0.15 | 0.125 | 624 |
| 4 | 0.36 | $CCl_4$ | $(CH_3)_3SiCl$ | 1.00 | 0.24 | 39 |
| 5 | 0.066 | $CH_2Cl_2$ | $(CH_3)_3SiCl$ | 1.00 | 0.07 | 441 |
| 6 |  | Xylene | $(CH_3)_3SiCl$ | 1.00 | 0.13 | 240 |
| 7 | 0.104 | $CH_2Cl_2$ | $(CH_3)_2SiCl_2$ | 0.50 | 0.10 | 185 |
| 8 | 0.104 | $CH_2Cl_2$ | $C_6H_5(CH_3)_2SiCl$ | 0.85 | 0.19 | 164 |
| 9 | 0.104 | $CH_2Cl_2$ | $(C_6H_5)_2CH_3SiCl$ | 1.15 | 0.44 | 89 |
| 10 | 0.104 | $CH_2Cl_2$ | $\{(CH_3)_3SiOC_2H_5$ / $(CH_3)_3SiCl\}$ | 0.60 / 0.022 | 0.11 | 590 |
| 11 | 0.104 | $CH_2Cl_2$ | $C_2H_5(CH_3)_2SiCl$ | 1.000 | 0.13 | 303 |
| 12 | 0.104 | $CH_2Cl_2$ | $(CH_3)C_6H_5Si(OC_2H_5)_2$ | 1.000 | 0.17 | 138 |

EXAMPLE 3

500 ml. of a silica hydrogel having a density of .107 gram of SiO$_2$ per ml. was broken into lumps of about 3 to 5 ml. in volume. The mixture of 1000 ml. of hexamethyldisiloxane, 250 ml. of ethanol and 75 ml. of concentrated hydrochloric acid were then added to the hydrogel. The mixture was allowed to stand for 4 hours during which time 240 ml. of an aqueous phase separated from the gel and was removed. After 24 hours, 50 ml. more of an aqueous phase separated. 100 ml. more of ethanol was then added and after 3 days 567 ml. more of an aqueous phase was removed. This aqueous phase was composed of alcohol and water which had been displaced from the hydrogel of hexamethyldisiloxane. The fluid was then decanted from the resulting organogel and the latter was dried by distillation and finally heated at 110° C. The resulting product was a soft, white powder having a bulk density of .12 g. per cc. and was composed of SiO$_2$ units having trimethylsilyl groups attached thereto.

30 parts by weight of this powder was milled with 100 parts by weight of a benzene-soluble nonflowing dimethylpolysiloxane and 3 parts by weight of tertiary butyl perbenozate. The mixture was then heated in a mold 15 minutes at 150° C. whereupon the resulting elastomer had a durometer of 32, a tensile strength of 893 p.s.i. and a percent elongation at break of 760.

EXAMPLE 4

100 ml. of an acid silica hydrogel having a density of .106 g. of SiO$_2$ per ml. and 200 ml. of hexamethyldisiloxane were mixed in a mechanical mixer. After 10 days' standing at room temperature an aqueous phase had separated and was discarded. The resulting organogel was then heated to remove the excess siloxane and finally dried at 110° C. The resulting product was a dry powder having a bulk density of .11 g. per cc. and was composed of SiO$_2$ units and trimethylsilyl units linked through oxygen atoms. This material was suitable as a filler in organosiloxane elastomers.

EXAMPLE 5

600 ml. of a silica hydrogel having a density of .08 gram of SiO$_2$ per cc. was mixed with 350 ml. of isopropyl alcohol and 250 ml. of 38 percent hydrochloric acid and thereafter stirred for 1 hour. 1000 ml. of octamethylcyclotetrasiloxane was then added. An aqueous phase separated from the gel in 15 minutes and after 1 hour it was removed. The resulting organogel was stirred for an additional 25 minutes whereupon more water was removed. The resulting organogel was filtered from the excess siloxane and then evaporated to dryness on a steam bath and finally heated 70 hours at 125° C. There was obtained a powder having a bulk density of .09 g. per cc. which was composed of SiO$_2$ and Me$_2$Si= units linked to oxygen atoms. This material was suitable for use as a filler in organosiloxane rubber.

EXAMPLE 6

600 ml. of a hydrogel composed of 80 mol percent SiO$_2$ and 20 mol percent MeSiO$_{3/2}$ which cohydrogel had a density of .07 g. per ml. was stirred 1 hour with 350 ml. of isopropyl alcohol and 250 ml. of 38 percent hydrochloric acid. 100 ml. of

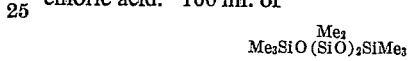

was then added and stirring was continued for 2 hours. The aqueous layer was then drawn off and the excess siloxane removed by distillation on a steam bath at reduced pressure. The resulting material was finally heated 16 hours at 145–150° C. whereupon a powder having a bulk density of .072 gram per ml. was obtained. This powder was composed of copolymerized SiO$_2$, MeSiO$_{3/2}$, Me$_2$SiO and Me$_3$Si$_{1/2}$ units. It is suitable for a filler in organosiloxane rubbers.

EXAMPLE 7

660 ml. of a cohydrogel composed of 3 mol percent MeSiO$_{1.5}$ and 97 mol percent SiO$_2$ and having a density of .078 gram of SiO$_2$ plus MeSiO$_{1.5}$ per ml. was mixed with 350 ml. of isopropyl alcohol and 250 ml. of 38 percent HCl. The mixture was stirred 1½ hours and then 800 ml. of hexamethyldisiloxane was added, and the mixture was again stirred for 1½ hours longer. The aqueous layer which had separated from the gel was then removed and the organogel was filtered free of excess hexamethyldisiloxane and finally heated for 40 hours at 110° C. The resulting material was a powder having a bulk density of .067 gram per cc. and was composed of copolymerized SiO$_2$, MeSiO$_{1.5}$ and MeSiO$_{1/2}$ units. This material is suitable as a filler for organosiloxane rubber.

EXAMPLE 8

Equivalent results are obtained when monopropylsiloxane is substituted for the monoethylsiloxane in the procedure of Example 7.

EXAMPLE 9

Equivalent results are obtained when divinyltetramethyldisiloxane is substituted for the hexamethyldisiloxane in Example 7.

EXAMPLE 10

Equivalent results are obtained when monovinylsiloxane is substituted for the monomethylsiloxane in the procedure of Example 7.

That which is claimed is:

1. The method of preparing hydrophobic organosilicon powders which comprises mixing (1) an organosilicon compound selected from the group consisting of compounds of the formula R$_n$SiX$_{4-n}$ and $$R_nSiO_{\frac{4-n}{2}}$$

in which R is selected from the group consisting of monovalent aliphatic hydrocarbon radicals of less than 5 carbon atoms and phenyl radicals, there being no more than one phenyl radical per silicon atom, X is selected from the group consisting of chlorine and alkoxy radicals of less than 6 carbon atoms, and $n$ has a value from 2 to 3 inclusive, said organosilicon compound being in a fluid state with (2) a polymeric silica organogel containing an inert solvent, which solvent has not been removed from said gel at any time prior to the reaction in which gel at least 50 mol percent of the polymer units are $SiO_2$ units any remaining polymer units being of the formula $R'SiO_{1.5}$, in which R' is a monovalent aliphatic hydrocarbon radical of less than 5 carbon atoms, said organogel (2) having from .02 to .35 g. of total $SiO_2$ and $R'SiO_{1.5}$ per cc. and said organosilicon compound (1) being present in amount such that there is reacted through SiOSi bonds at least .04 organosilyl unit of compound (1) per polymer unit of (2) in the presence of a strong acid catalyst and thereafter removing the volatile materials from the organogel whereby a dry powdery material having a pore volume of at least 3 cc. per g. as determined by the difference in volume of mercury and octamethylcyclotetrasiloxane absorbed by a given weight of the dry powder is obtained.

2. The method of reacting a silica organogel with a silane which comprises mixing (1) a silane of the formula $R_nSiCl_{4-n}$ where R is a monovalent aliphatic hydrocarbon radical of less than 5 carbon atoms and $n$ has a value from 2-3 inclusive, with (2) a polymeric organogel containing an inert solvent, which solvent has not been removed from said gel at any time prior to the reaction, in which gel at least 50 mol percent of the polymer units are $SiO_2$ units, any remaining units being of the formula $R'SiO_{1.5}$ in which R' is an monovalent aliphatic hydrocarbon radical of less than 5 carbon atoms, said organogel (2) having from .02 to .35 g. of total $SiO_2$ and $R'SiO_{1.5}$ per cc. and said organosilicon compound (1) being present in amount such that there is reacted through SiOSi bonds at least .04 organosilyl unit of compound (1) per polymer unit of compound (2) and thereafter removing the volatile materials from the organogel whereby a dry, powdery material having a pore volume of at least 3 cc. per g. as determined by the difference in volume of mercury and octamethylcyclotetrasiloxane absorbed by a given weight of the dry powder, is obtained.

3. The method in accordance with claim 2 in which the silane (1) is trimethylchlorosilane.

4. A method of reacting a silica organogel with a silane which comprises mixing (1) a silane of the formula $R_nSiCl_{4-n}$ in which R is an alkyl radical of less than 5 carbon atoms and $n$ has a value from 2-3 inclusive with (2) a polymeric silica organogel containing a solvent, which solvent has not been removed from said gel at any time prior to the reaction, said organogel having from .02 to .35 g. of $SiO_2$ per cc., the solvent in said organogel being inert to the silane, said silane being present in amount such that there is reacted through SiOSi bonds at least .06 mol of said silane per mol of $SiO_2$ in said gel and thereafter removing volatile materials from the silica organogel whereby a powdery material having a pore volume of at least 3 ccs. per g. as determined by the difference in volume of mercury and octamethylcyclotetrasiloxane absorbed by a given weight of the powdery material, is obtained.

5. The method in accordance with claim 4 in which the silane is trimethylchlorosilane.

6. A composition having a pore volume of at least 3 ccs. per gram as determined by the difference in volume of mercury and octamethylcyclotetrasiloxane absorbed by a given weight of the composition, said composition being composed of $SiO_2$ units and organosilyl groups of the formula $R_nSi$ in which R is selected from the group consisting of monovalent aliphatic hydrocarbon radicals of less than 5 carbon atoms and phenyl radicals in which organosilyl groups no more than one R per silicon is phenyl and $n$ is an integer from 2 to 3 inclusive, in which composition the ratio of organosilyl groups to silicon atoms of the $SiO_2$ is from .06 to .6, said organosilyl groups being connected to the silicon atoms of the $SiO_2$ through SiOSi linkages.

7. A composition in accordance with claim 6 in which each R is methyl.

8. The method of preparing a hydrophobic organosilicon powder which comprises mixing (1) an organosiloxane of the formula $$R_nSiO_{\frac{4-n}{2}}$$

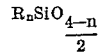

in which R is a monovalent aliphatic hydrocarbon radical of less than 5 carbon atoms and $n$ has a value from 2 to 3 inclusive, said organosiloxane being in a fluid state, (2) a polymeric silica hydrogel in which at least 50% of the polymer units are $SiO_2$ units, any remaining polymer units being of the formula $R'SiO_{1.5}$ in which R' is a monovalent aliphatic hydrocarbon radical of less than 5 carbon atoms, said hydrogel (2) having from .02 to .35 g. of total $SiO_2$ and $R'SiO_{1.5}$ per cc. and (3) an inert solvent in amount sufficient to form an organogel from said hydrogel by replacement of the water in said hydrogel with said inert solvent, in the presence of a strong acid catalyst whereby said organosiloxane (1) is reacted with said organogel from which the solvent has not been removed at any time prior to the reaction, through SiOSi linkages in amount such that there is at least .04 organosilyl units of compound (1) per polymer unit of compound (2) and thereafter removing the volatile materials from the reaction product whereby a dry powdery material having a pore volume of at least 3 ccs. per g. as determined by the difference in volume of mercury and octamethylcyclotetrasiloxane absorbed by a given weight of the dry powder is obtained.

9. The method in accordance with claim 8 wherein the siloxane is hexamethyldisiloxane.

10. The method of preparing a hydrophobic organosilicon composition which comprises mixing (1) an organosiloxane of the formula $$R_nSiO_{\frac{4-n}{2}}$$

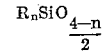

in which R is a monovalent aliphatic hydrocarbon radical of less than 5 carbon atoms and $n$ has a value from 2 to 3 inclusive, said organosiloxane being in a fluid state, (2) a polymeric silica hydrogel in which all of the polymer units are $SiO_2$ units, said hydrogel (2) having from .02 to .35 g. of $SiO_2$ per cc. and (3) an inert solvent in amount sufficient to convert the hydrogel to an organogel by replacement of the water in said hydrogel with said inert solvent, in the presence of an acid catalyst whereby the siloxane reacts with said organogel, from which the solvent has not been removed at any time prior to the reaction, said organosilicon compound (1) being present in amount such that there is reacted through SiOSi linkages at least .06 organosilyl units of compound (1) per $SiO_2$ unit of (2), whereby a product is obtained which when in the dry state is a powdery material having a pore volume of at least 3 ccs. per g. as determined by the difference in volume of mercury and octamethylcyclotetrasiloxane absorbed by a given weight of the dry powder.

11. The method of claim 10 wherein the siloxane (1) is hexamethyldisiloxane.

12. The method of preparing hydrophobic organosilicon compositions which comprises mixing (1) an organosilicon compound selected from the group consisting of compounds of the formula $R_nSiX_{4-n}$ and $$XR_nSiO_{\frac{4-n}{2}}$$

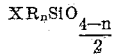

in which R is selected from the group consisting of monovalent aliphatic hydrocarbon radicals of less than 5 carbon atoms and phenyl radicals, there being no more than one phenyl radical per silicon atom, X is selected from the group consisting of chlorine and alkoxy radicals of less than 6 carbon atoms, and $n$ has a value from 2 to 3 inclusive, said organosilicon compound being in a fluid state with (2) a polymeric silica organogel containing an inert solvent, which solvent has not been removed from said gel at any time prior to the reaction, in which gel at least 50 mol percent of the polymer units are $SiO_2$ units, any remaining polymer units being of the formula $R'SiO_{1.5}$ in which R' is a monovalent aliphatic hydrocarbon radical of less than 5 carbon atoms, said organogel (2) having from .02 to .35 g. of total $SiO_2$ and $R'SiO_{1.5}$ per cc. and said organosilicon compound (1) being present in amount such that there is reacted through SiOSi linkages at least .04 organosilyl units of compound (1) per polymer unit of (2), in the presence of a strong acid catalyst whereby a composition is obtained which when in the dry state is a powdery material having a pore volume of at least 3 ccs. per gram as determined by the difference in volume of mercury and octamethylcyclotetrasiloxane absorbed by a given weight of the dry powder.

References Cited in the file of this patent

UNITED STATES PATENTS

| | | |
|---|---|---|
| 2,428,608 | Bass | Oct. 7, 1947 |
| 2,441,422 | Krieble et al. | May 11, 1948 |
| 2,452,416 | Wright | Oct. 26, 1948 |
| 2,541,137 | Warrick | Feb. 13, 1951 |
| 2,567,315 | Bidaul | Sept. 11, 1951 |
| 2,567,316 | Bidaud | Sept. 11, 1951 |
| 2,589,705 | Kistler | Mar. 18, 1952 |
| 2,610,167 | Te Grotenhuis | Sept. 9, 1952 |
| 2,615,006 | Lane | Oct. 21, 1952 |
| 2,645,588 | Barry | July 14, 1953 |
| 2,676,182 | Daudt | Apr. 20, 1954 |

UNITED STATES PATENT OFFICE
CERTIFICATE OF CORRECTION

Patent No. 3,015,645            January 2, 1962

Leslie J. Tyler

It is hereby certified that error appears in the above numbered patent requiring correction and that the said Letters Patent should read as corrected below.

Columns 5 and 6, Table I, second column, line 2 thereof, for "0.014" read -- 0.104 --; column 6, line 51, for the formula reading "$MeSiO_{1/2}$" read -- $Me_3SiO_{1/2}$ --.

Signed and sealed 31st day of July 1962.

(SEAL)
Attest:

ERNEST W. SWIDER
Attesting Officer

DAVID L. LADD
Commissioner of Patents